US012046847B2

(12) United States Patent
Zhang

(10) Patent No.: US 12,046,847 B2
(45) Date of Patent: Jul. 23, 2024

(54) CONNECTOR AND ELECTRONIC DEVICE USING THE SAME

(71) Applicant: HONG FU JIN PRECISION INDUSTRY (WuHan) CO., LTD., Wuhan (CN)

(72) Inventor: Feng Zhang, Wuhan (CN)

(73) Assignee: HONG FU JIN PRECISION INDUSTRY (WuHan) CO., LTD., Wuhan (CN)

( * ) Notice: Subject to any disclaimer, the term of this patent is extended or adjusted under 35 U.S.C. 154(b) by 344 days.

(21) Appl. No.: 17/668,535

(22) Filed: Feb. 10, 2022

(65) Prior Publication Data

US 2023/0081215 A1 Mar. 16, 2023

Related U.S. Application Data

(63) Continuation-in-part of application No. PCT/CN2021/117794, filed on Sep. 10, 2021.

(51) Int. Cl.

*H01R 13/422* (2006.01)
*H01R 12/51* (2011.01)
*H01R 13/03* (2006.01)

(52) U.S. Cl.

CPC ....... *H01R 13/4226* (2013.01); *H01R 12/515* (2013.01); *H01R 13/03* (2013.01)

(58) Field of Classification Search

CPC .. H01R 13/4226; H01R 12/515; H01R 13/03; H01R 13/6461; H01R 24/60

See application file for complete search history.

(56) References Cited

U.S. PATENT DOCUMENTS

| | | | | |
|---|---|---|---|---|
| 9,350,125 | B2 * | 5/2016 | Jones | H01R 24/60 |
| 9,577,392 | B2 * | 2/2017 | Chang | G06F 13/4068 |
| 10,361,498 | B2 * | 7/2019 | Chuang | H05K 1/117 |
| 10,361,523 | B2 * | 7/2019 | Chuang | H05K 1/117 |

FOREIGN PATENT DOCUMENTS

| | | |
|---|---|---|
| CN | 103972729 A | 8/2014 |
| CN | 107026341 A | 8/2017 |

* cited by examiner

*Primary Examiner* — Briggitte R. Hammond

(74) *Attorney, Agent, or Firm* — ScienBiziP, P.C.

(57) ABSTRACT

The disclosure provides a connector and an electronic device using the connector. The connector is connected with a conductive element. The connector includes a terminal support component, a multiple of gold fingers and an electric conversion component. The terminal support component includes a first surface and a second surface. The first surface is opposite to the second surface or the first surface and the second surface are arranged at intervals. The multiple of gold fingers symmetrically arranged on the first surface and the second surface. The electric conversion component includes a main electric unit and two auxiliary conductive units. The main electric unit is electrically connected the two auxiliary conductive units and the conductive element. The two auxiliary conductive units are electrically connected with the gold fingers that respectively arranged on the first surface and the second surface of the terminal support component.

16 Claims, 10 Drawing Sheets

CONNECTOR AND ELECTRONIC DEVICE USING THE SAME

FIELD

The subject matter relates to a connector and an electronic device using the same.

BACKGROUND

Current mainstream electronic products, such as mobile phones, computers, smart home appliances and other electronic products are equipped with connectors. The connector can be used for transmitting electrical signals, charging and discharging, etc. In order to improve user experience, double-sided pluggable connectors are becoming a necessary structure in mainstream electronic products.

Existing double-sided pluggable connectors tend to experience significant signal attenuation when applied to high frequency signals (frequencies greater than 1 GHz). How to solve the above problems is the technical personnel in this field need to consider.

SUMMARY

The purpose of the invention is to solve the problem of signal attenuation faced by the double-sided pluggable connector applied to high frequency signals in the prior art.

A Connector is connected with a conductive element located outside the connector to transmit an electrical signal, the connector comprising:

- terminal support component, wherein the terminal support component comprises a first surface and a second surface, the first surface is separated from or opposite to the second surface;
- gold fingers, the number of gold fingers is multiple, the multiple of gold fingers are symmetrically arranged on the first surface and the second surface; and
- the electric conversion component comprises a main electric unit and two auxiliary conductive units, the main electric unit and the two auxiliary conductive units are electrically connected; the main electric unit is electrically connected with the conductive element; the two auxiliary conductive units are electrically connected with gold fingers that respectively arranged on two sides of the phase back of the terminal support component; a joint between the two auxiliary conductive units and the main electrical unit to achieve an electrical connection is located inside the connector.

Furthermore, the distance between the joint and each gold finger is less than 1 cm.

Furthermore, the multiple of gold fingers are described in the front end of the terminal support component, the multiple gold fingers comprising a first terminal group and a second terminal group, the first terminal group and the second terminal group are separated from each other, the first terminal group and the second terminal group has the same number of the gold fingers, the first terminal group is arranged on the first surface, and the second terminal group is arranged on the second surface.

Furthermore, the electric conversion component is arranged on the back end of the terminal support component, and the main electrical unit is arranged on the side of the auxiliary conductive unit away from the multiple of gold finger.

Furthermore, the terminal support component is plate shaped whose two major surfaces define the first and the second surfaces.

Furthermore, the connector is further configured to receive a mother board, and the connector also comprises a shell, the shell is wrapped with the terminal support component, and the front end of the terminal support component is toward the opening of the shell.

Furthermore, the terminal support component is hollow column shaped whose two major surfaces define the first and the second surfaces, the first surface and the second surface are arranged face to face, and the front end of the terminal support component is oriented toward the opening of the hollow column terminal support component.

Furthermore, the connector is further configured to receive a cable.

Electronic device, comprising function subassembly and connector, the connector is electrically connected with the functional subassembly to realize electrical signal interaction, and the connector according to any of the above embodiments.

Compared to prior art, the electric conversion component comprises a main electric unit and two auxiliary conductive units, the main electric unit and the two auxiliary conductive units are electrically connected; the main electric unit is electrically connected with the conductive element; the two auxiliary conductive units are electrically connected with gold fingers that respectively arranged on two sides of the phase back of the terminal support component; a joint between the two auxiliary conductive units and the main electrical unit to achieve an electrical connection is located inside the connector. The two auxiliary conductive units are bifurcated by the main electrical unit. The two auxiliary conductive units are respectively connected to two groups of the gold fingers set at intervals, so as to realize the double-sided plug and pull function of the connector. The “bifurcation” joints between the two auxiliary conductive units and the main electrical unit is located inside the connector. In traditional structures, “bifurcation” joints are usually located outside the connector. The connector in this application can effectively shorten the length of empty circuit or open circuit, so as to effectively reduce the loss of high-frequency electrical signals in the transmission process.

DETAILED DESCRIPTION

Figure 1:
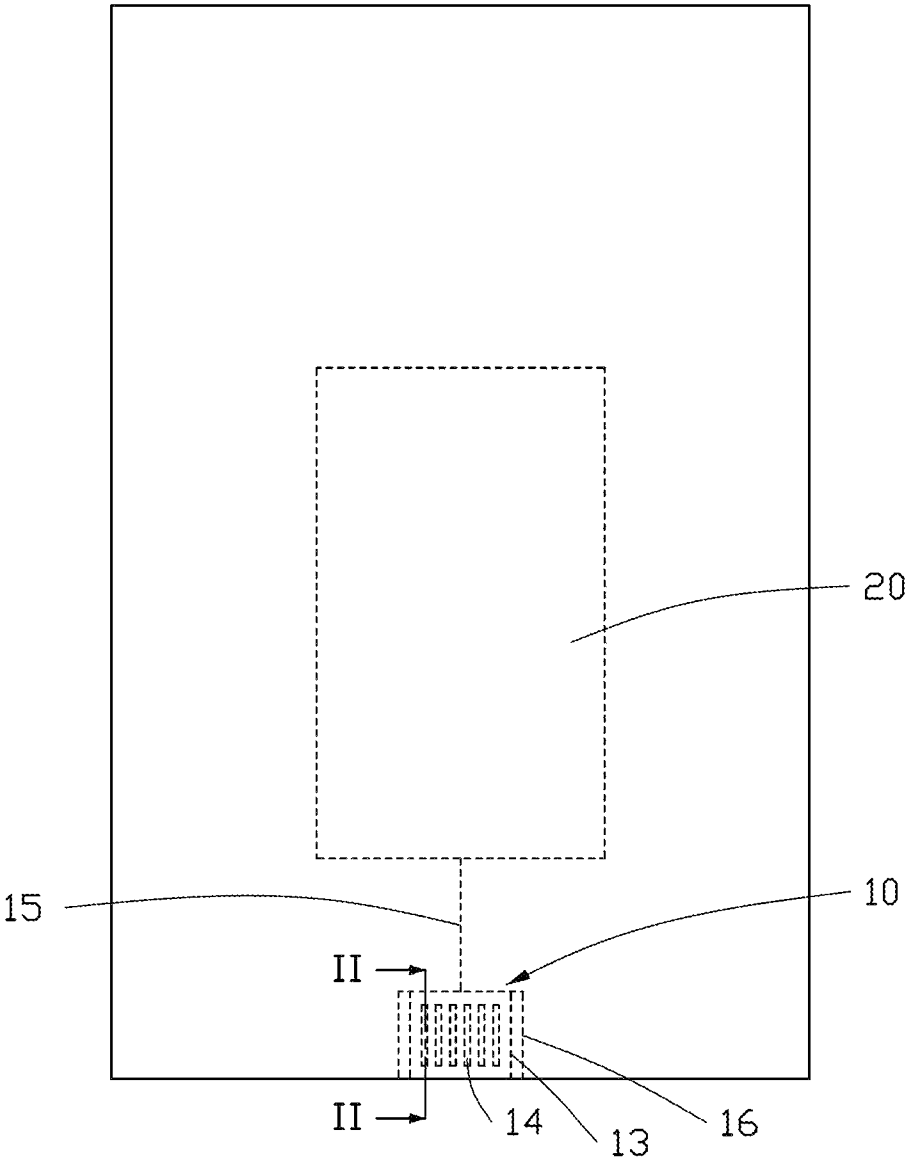
FIG. 1 is an structure view of a connector according to a embodiment of the present disclosure.

The following descriptions refer to the attached drawings for a more comprehensive description of this application.

Sample embodiments of this application are shown in the attached drawings. However, this application can be implemented in many different forms and should not be construed as limited to exemplary embodiments set forth herein. These exemplary embodiments are provided to make this application thorough and complete, and to adequately communicate the scope of this application to those skilled in the field. Similar diagram tags represent the same or similar components.

The terms used herein are intended only to describe the purpose of particular exemplary embodiments and are not intended to limit this application. As used herein, the singular forms "one", "one" and "the" are intended to include the plural as well, unless the context otherwise clearly indicates it. In addition, when used herein, the words "include" and/or "include" and/or "have", integers, steps, operations, components and/or components, without excluding the existence or addition of one or more other features, regions, integers, steps, operations, components, components and/or groups thereof.

Unless otherwise defined, all terms used herein (including technical and scientific terms) have the same meaning as would normally be understood by ordinary technicians in the field of this application. In addition, unless expressly defined in the context, terms such as those defined in a general dictionary shall be construed to have meanings consistent with those in the relevant technology and in the content of this application, and shall not be construed to have idealistic or overly formal meanings.

Examples of embodiments are described below in combination with the attached drawings. It should be noted that the components depicted in the attached drawings may not be shown to scale; The same or similar components will be assigned the same or similar drawing mark representation or similar technical terms.

The following is a detailed description of the specific implementation of this application by referring to the attached drawings.

As shown in FIG. 1 to FIG. 8, shows the connector 10, the connector 10 can be used in different scenarios. As shown in FIG. 1 to FIG. 4, the connector 10 can be applied to an electronic device with a circuit board or other electronic component. Or, as shown in FIGS. 5 to 8, the connector 10 can be applied to a data line that used to connect an electronic device.

The connector 10 is connected with a conductive element 20 that located outside the connector 10 to transmit an electrical signal, the connector 10 comprises terminal support component 13, gold finger 14, electric conversion component 15.

Wherein, the gold finger 14 is arranged on the terminal support component 13, the electric conversion component 15 is electrically connected to the gold finger 14. The gold finger 14 is electrically connected to the external conductive element 20 through the electric conversion component 15.

Furthermore, the terminal support component 13 comprises a first surface 131 and a second surface 132, the first surface 131 is opposite to the second surface 132 or the first surface 131 and the second surface 132 are arranged at intervals. A multiple of gold fingers 14 symmetrically arranged on the first surface 131 and the second surface 132. The electric conversion component 15 comprises a main electric unit 151 and two auxiliary conductive units 152. The main electric unit 151 is electrically connected the two auxiliary conductive units 152 and the conductive element 20. The two auxiliary conductive units 152 are electrically connected with gold fingers 14 that respectively arranged on the first surface 131 and the second surface 132 of the terminal support component 13. A joint 150 between the two auxiliary conductive units 152 and the main electrical unit 151 to achieve an electrical connection is located inside the connector 10.

Furthermore, the two auxiliary conductive units 152 intersect with the main electrical unit 151 at the same joint 150. The two auxiliary conductive units 152 are non-contacting and insulated with each other in areas other than the joint 150. And, it can be understand, the two auxiliary conductive units 152 are electrically connected to the main electrical unit 151, or the two auxiliary conductive units 152 are extended from the main electrical unit 151. The two auxiliary conductive units 152 are bifurcated within connector 10, and the two auxiliary conductive units 152 are respectively connected to multiple of distant gold fingers 14.

The distance between the joint 150 where the two auxiliary conductive units 152 and the main electrical unit 151 are connected to and the gold fingers 14 is less than 1 cm, furthermore, the distance can be less than 0.75 cm. These values are much smaller than the distance between the connector 150 and the gold finger 14 in the prior art when the connector 150 is located outside the connector 10. Therefore, the connector 10 of this application can effectively shorten the length of empty or open circuit in the circuit.

The two auxiliary conductive units 152 are bifurcated from the main electrical unit 151. The two auxiliary conductive units 152 are connected to two distant gold fingers 14. The above structure is used to meet the double-sided insertion and removal requirements of connector 10. The "bifurcation" joints 150 between the two auxiliary conductive units 152 and the main electrical unit 151 is located inside the connector 10. In traditional structures, "bifurcation" joints 150 are usually located outside the connector 10. The connector 10 in this application can effectively shorten the length of empty circuit or open circuit, so as to effectively reduce the loss of high-frequency electrical signals in the transmission process.

It can be understood that, within the range allowed by the manufacturing process, the smaller the distance between the joint 150 and the gold fingers 14, the smaller the loss of the electrical signal in the transmission process.

Furthermore, the gold fingers 14 are positioned at a first end 136 of the terminal support component 13. The gold fingers 14 comprise a first terminal group 141 and a second terminal group 142 at intervals. The first terminal group 141 and the second terminal group 142 has the same number of the gold fingers 14. The first terminal group 141 can be arranged on the first surface 131, and the second terminal group 142 can be arranged on the second surface 132. In this embodiment, gold fingers 14 are equally divided into the first terminal group 141 and the second terminal group 142 in the same number. The first terminal group 141 and the second terminal group 142 are set symmetrically. The first terminal group 141 and the second terminal group 142 are symmetrically arranged at the first end 136 of the terminal support component 13. The first terminal group 141 and the second terminal group 142 are used for electrical connection with other conductive elements for transmission of electrical signals.

Furthermore, the electric conversion component 15 is arranged on a second end 137 of the terminal support component 13 opposite to the first end 136. The main electrical unit 151 is arranged on a side of the auxiliary conductive unit 152 away from the gold finger 14. That is, the main electrical unit 151 is electrically connected with the external conductive element 20 to realize the transmission of electrical signals. The main electrical unit 151 "bifurcates" the signal at the joint 150, and electrically connects the "bifurcated" signal with the first terminal group 141 and the second terminal group 142 through the two auxiliary conductive units 152 to realize the transmission of electrical signals.

Figure 2:
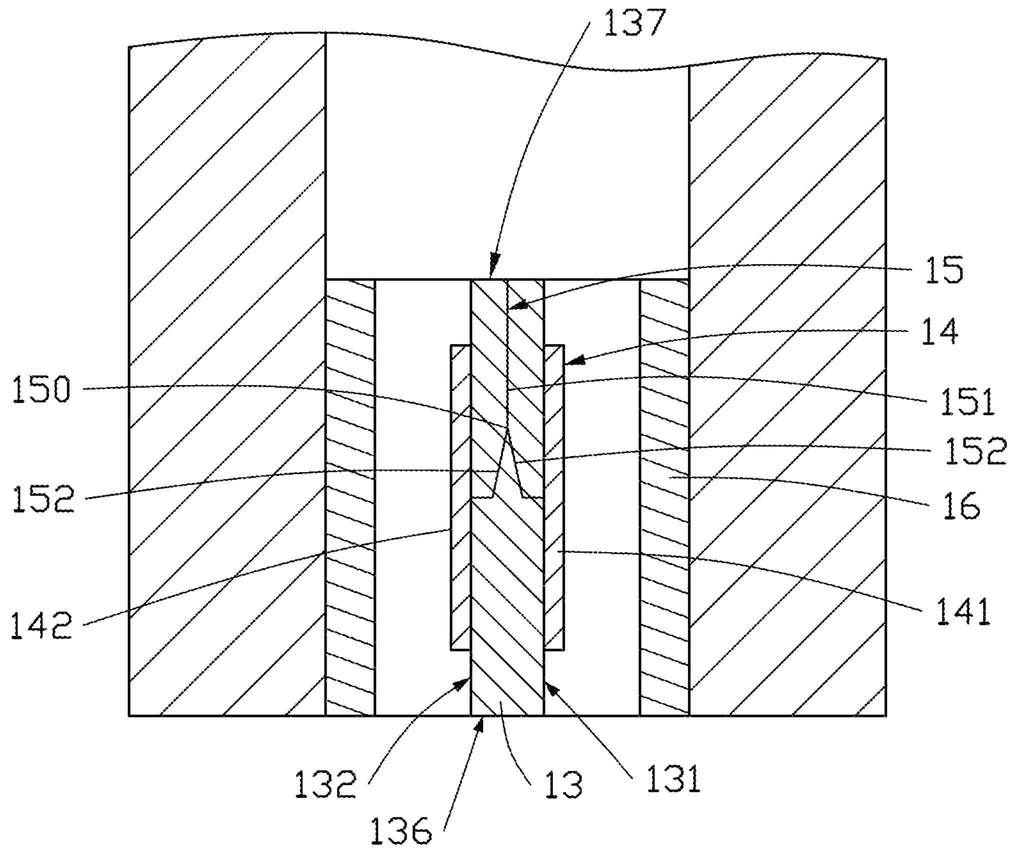
FIG. 2 is a cross-sectional view along line II-II of FIG. 1.
Figure 3:
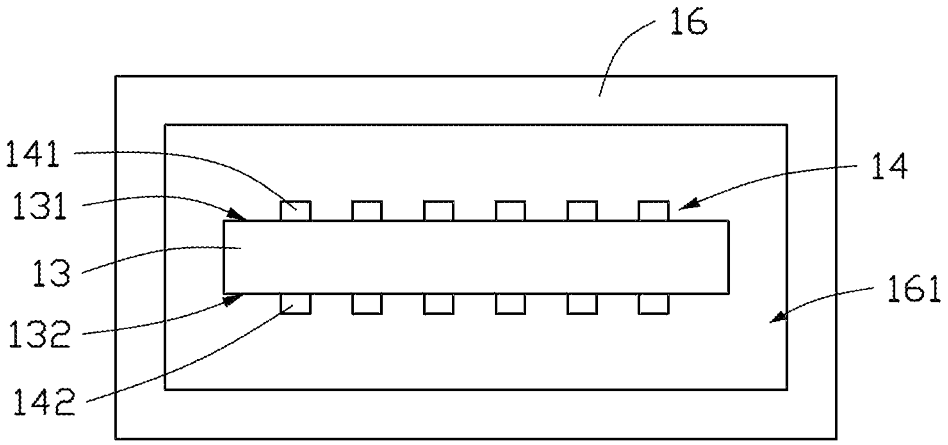
FIG. 3 is an structure view of a connector according to a embodiment of the present disclosure.

As shown in FIG. 1 to FIG. 3, is an structure view of the connector 10 according to the embodiment. The connector 10 can be used in an electronic device.

the conductive element 20 is a mother board of a circuit board, the mother board of the circuit board can be an main board of the electronic device or a connection board that is connected to the main board of the electronic device. The electronic device is electrically connected with other transmission units through the connector 10.

The connector 10 further comprises a shell 16. The shell 16 can be an accommodate structure to accommodate with terminal support component 13, gold finger 14 and electrical adapter component 15. The shell 16 comprises at least one first opening 161. The shell 16 wraps with the terminal support component 13. The first end 136 of the terminal support component 13 is extended toward the first opening 161 of the shell 16.

Wherein, the first surface 131 and the second surface 132 are arranged opposite each other. The first surface 13 land the second surface 132 are respectively arranged on two sides of the terminal support component 13.

Figure 5:
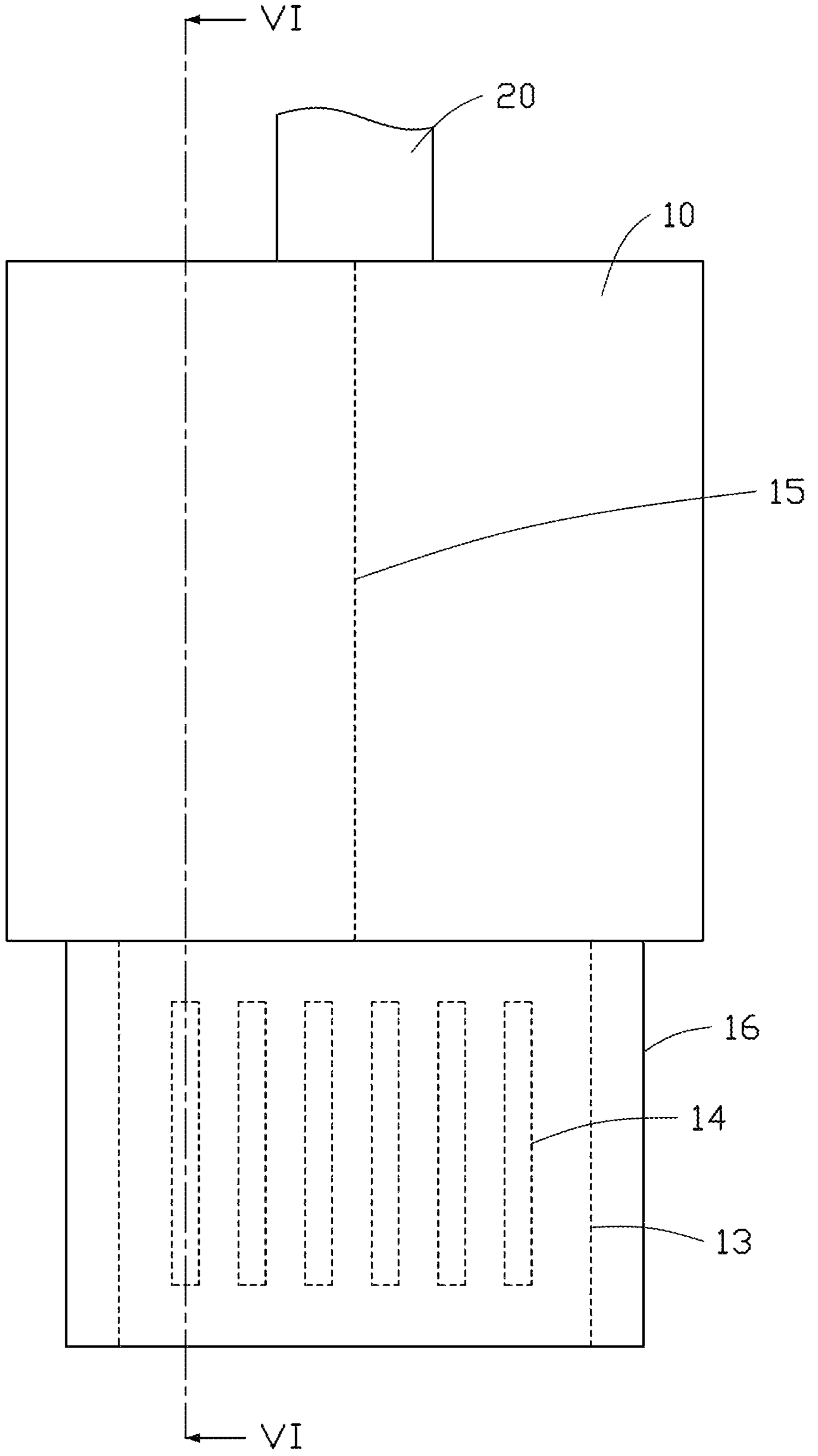
FIG. 5 is an structure view of a connector according to a embodiment of the present disclosure.
Figure 6:
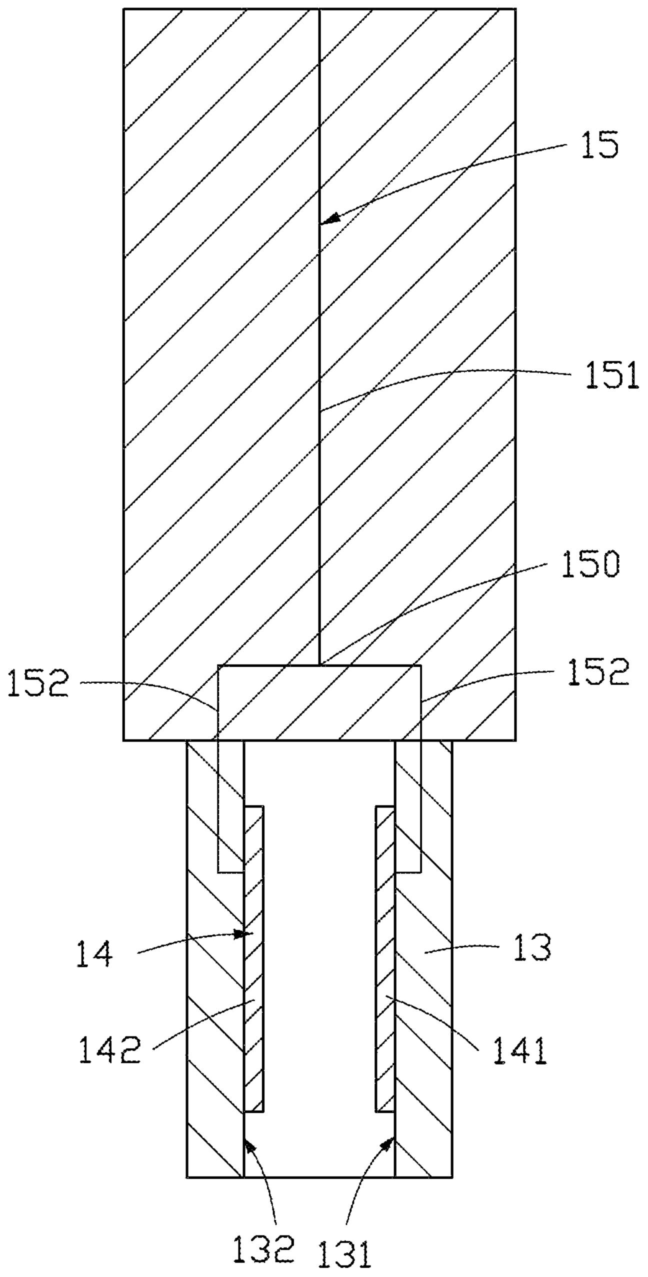
FIG. 6 is a cross-sectional view along line VI-VI of FIG. 5.
Figure 7:
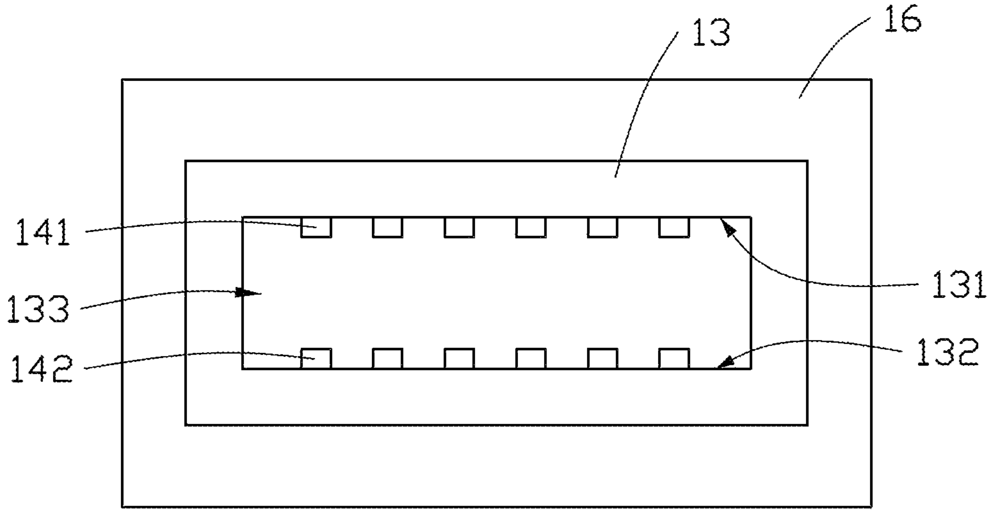
FIG. 7 is an structure view of a connector according to a embodiment of the present disclosure.

As shown in FIG. 5 to FIG. 7, is an structure view of the connector 10 according to another embodiment. The connector 10 can be arranged at the end of a cable used to connect an electronic device. In this embodiment, conductive element 20 is the cable.

The first surface 131 and the second surface 132 are arranged face to face, the first surface 131 and the second surface 132 are arranged on the opposite sides of the inner surface of the hollow column terminal support component 13. The first end 136 of the terminal support component 13 is oriented toward the second opening 133 of the hollow column terminal support component 13.

Figure 4:
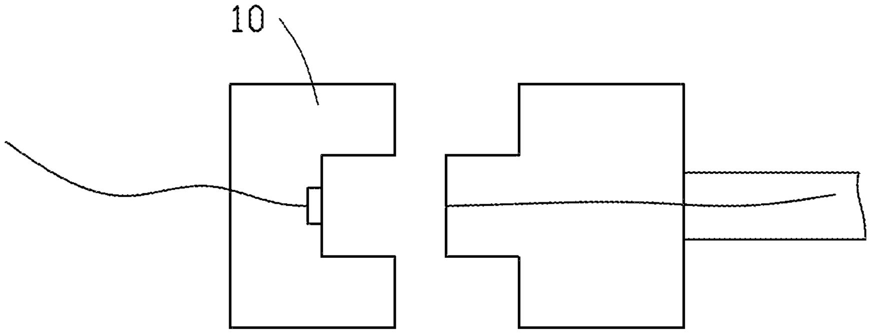
FIG. 4 is working condition view of the connector according to FIG. 1 to FIG. 3.
Figure 8:
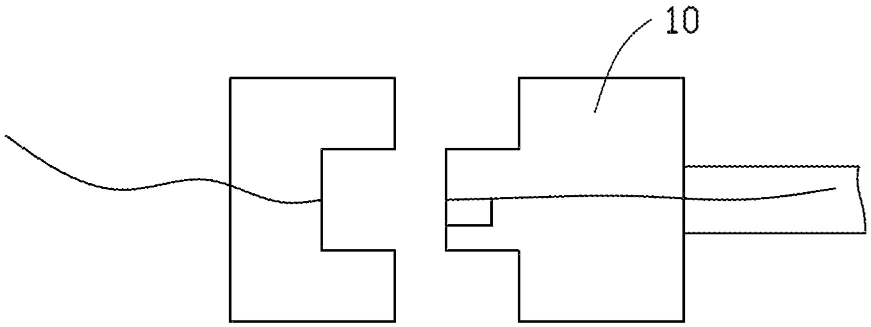
FIG. 8 is working condition view of the connector according to FIG. 5 to FIG. 7.

As shown in FIG. 4 and FIG. 8, show the application of connector 10 in two embodiments of FIGS. 1 to 3 and FIGS. 5 to 8 respectively.

It is understood that, when connector 10 of the two embodiments shown in FIG. 4 and FIG. 8 is not limited to either of the two embodiments, it can achieve the effect of reducing signal transmission attenuation.

Figure 9:
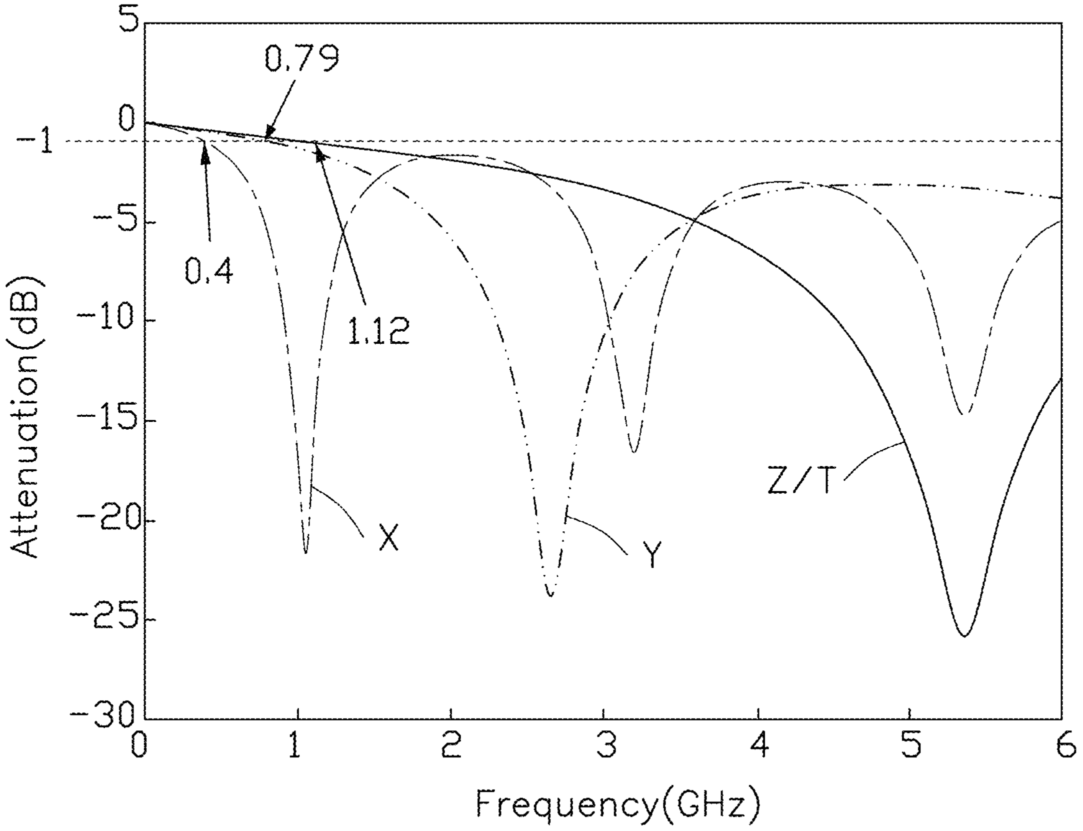
FIG. 9 is schematic view of electronic simulation test of the connector according to FIG. 4 and FIG. 8.

FIG. 9 shows the structure view of an electronic device 10, with 1 dB bandwidth as cut-off frequency. Among them, curves X and Y represent the change curve of electrical signal attenuation when the connector 150 is not set for "bifurcating" in the traditional technology. The cut-off frequency of curve X is 0.4 ghz, and that of curve Y is 0.79 ghz. The curve Z/T represents the change curve of electrical signal attenuation of the connector "bifurcated" at junction 150 adopted in this application embodiment. The cutoff frequency of curve Z/T is 1.12 ghz, and the corresponding loss standard of curve Z/T can reach the available bandwidth and performance. According to the curves in the figure, connector 10 applied in this paper can effectively reduce the loss of high-frequency electrical signals in the transmission process.

Figure 10:
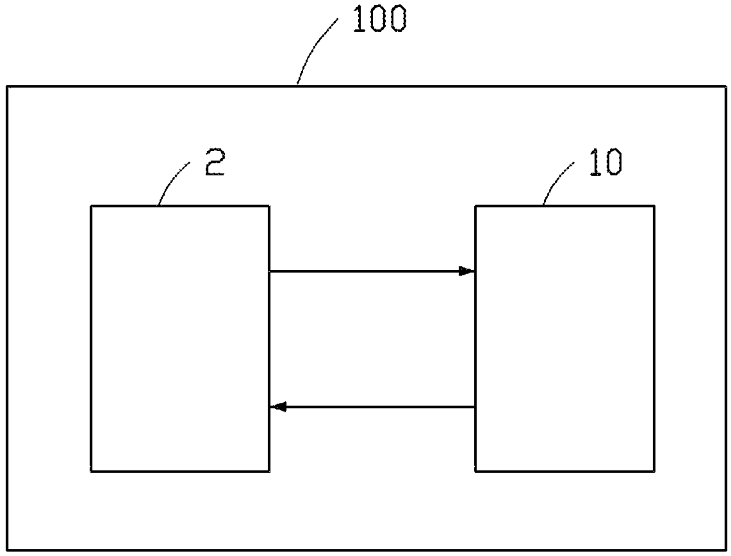
FIG. 10 is a structure view of an electronic device according to a embodiment of the present disclosure.

As shown in FIG. 10, this application embodiment also provides an electronic device 100. The electronic device 100 comprises a functional subassembly 2 and a connector 10 electrically connected with the functional subassembly 2 to realize electrical signal interaction. In this embodiment, the electronic device 100 in FIG. 10 can be a personal computer, an intelligent home appliance, an industrial controller, an electric vehicle, a petrol-electric hybrid vehicle, etc.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A connector being connected with a conductive element located outside the connector to transmit electrical signals, comprising:

a terminal support component, wherein the terminal support component comprises a first surface and a second surface, the first surface is opposite to the second surface or the first surface and the second surface are arranged at intervals;

a multiple of gold fingers symmetrically arranged on the first surface and the second surface; and an electric conversion component comprising a main electric unit and two auxiliary conductive units, wherein the main electric unit is electrically connected the two auxiliary conductive units and the conductive element; the two auxiliary conductive units are electrically connected with the multiple of gold fingers, the multiple of gold fingers are respectively arranged on the first surface and the second surface of the terminal support component; a joint connected the two auxiliary conductive units and the main electrical unit is located inside the connector.

2. The connector of claim 1, wherein the distance between the joint and each gold finger is less than 1 cm.

3. The connector of claim 2, wherein the multiple of gold fingers are positioned at a first end of the terminal support component, the gold fingers comprise a first terminal group and a second terminal group arranged at intervals, the first terminal group and the second terminal group has the same number of the gold fingers, the first terminal group is arranged on the first surface, and the second terminal group is arranged on the second surface.

4. The connector of claim 3, wherein the electric conversion component is arranged on a second end of the terminal support component opposite to the first end, and the main electrical unit is arranged on a side of the auxiliary conductive unit away from the multiple of gold fingers.

5. The connector of claim 4, wherein the terminal support component is plate shaped whose two major surfaces define the first and the second surfaces.

6. The connector of claim 5, wherein the connector is further configured to receive a mother board, and the connector further comprises a shell, the shell wraps with the terminal support component, and the first end of the terminal support component is extended toward the opening of the shell.

7. The connector of claim 4, wherein the terminal support component is hollow column shaped whose two major surfaces define the first and the second surfaces, the first surface and the second surface are arranged face to face, and the first end of the terminal support component is extended toward the opening of the hollow column terminal support component.

8. The connector of claim 7, wherein the connector is further configured to receive a cable.

9. An electronic device, comprising:

function subassembly;

connector, wherein connector being connected with a conductive element located outside the connector to transmit electrical signals, comprising:

a terminal support component, wherein the terminal support component comprises a first surface and a second surface, the first surface is opposite to the second surface or the first surface and the second surface are arranged at intervals;

a multiple of gold fingers symmetrically arranged on the first surface and the second surface; and an electric conversion component comprising a main electric unit and two auxiliary conductive units, wherein the main electric unit is electrically connected the two auxiliary conductive units and the conductive element; the two auxiliary conductive units are electrically connected with the multiple of gold fingers, the multiple of gold fingers are respectively arranged on the first surface and the second surface of the terminal support component; a joint connected the two auxiliary conductive units and the main electrical unit is located inside the connector.

10. The electronic device of claim 9, wherein the distance between the joint and each gold finger is less than 1 cm.

11. The electronic device of claim 10, wherein the multiple of gold fingers are positioned at a first end of the terminal support component, the gold fingers comprise a first terminal group and a second terminal group arranged at intervals, the first terminal group and the second terminal group has the same number of the gold fingers, the first terminal group is arranged on the first surface, and the second terminal group is arranged on the second surface.

12. The electronic device of claim 11, wherein the electric conversion component is arranged on a second end of the terminal support component opposite to the first end, and the main electrical unit is arranged on a side of the auxiliary conductive unit away from the multiple of gold fingers.

13. The electronic device of claim 12, wherein the terminal support component is plate shaped whose two major surfaces define the first and the second surfaces.

14. The electronic device of claim 13, wherein the connector is further configured to receive a mother board, and the connector further comprises a shell, the shell wraps with the terminal support component, and the first end of the terminal support component is extended toward the opening of the shell.

15. The electronic device of claim 12, wherein the terminal support component is hollow column shaped whose two major surfaces define the first and the second surfaces, the first surface and the second surface are arranged face to face, and the first end of the terminal support component is extended toward the opening of the hollow column terminal support component.

16. The electronic device of claim 15, wherein the connector is further configured to receive a cable.

* * * * *